Jan. 8, 1935. H. W. ZIMMERMAN 1,987,457
CYLINDER GRINDING TOOL
Filed Aug. 20, 1932 3 Sheets-Sheet 1
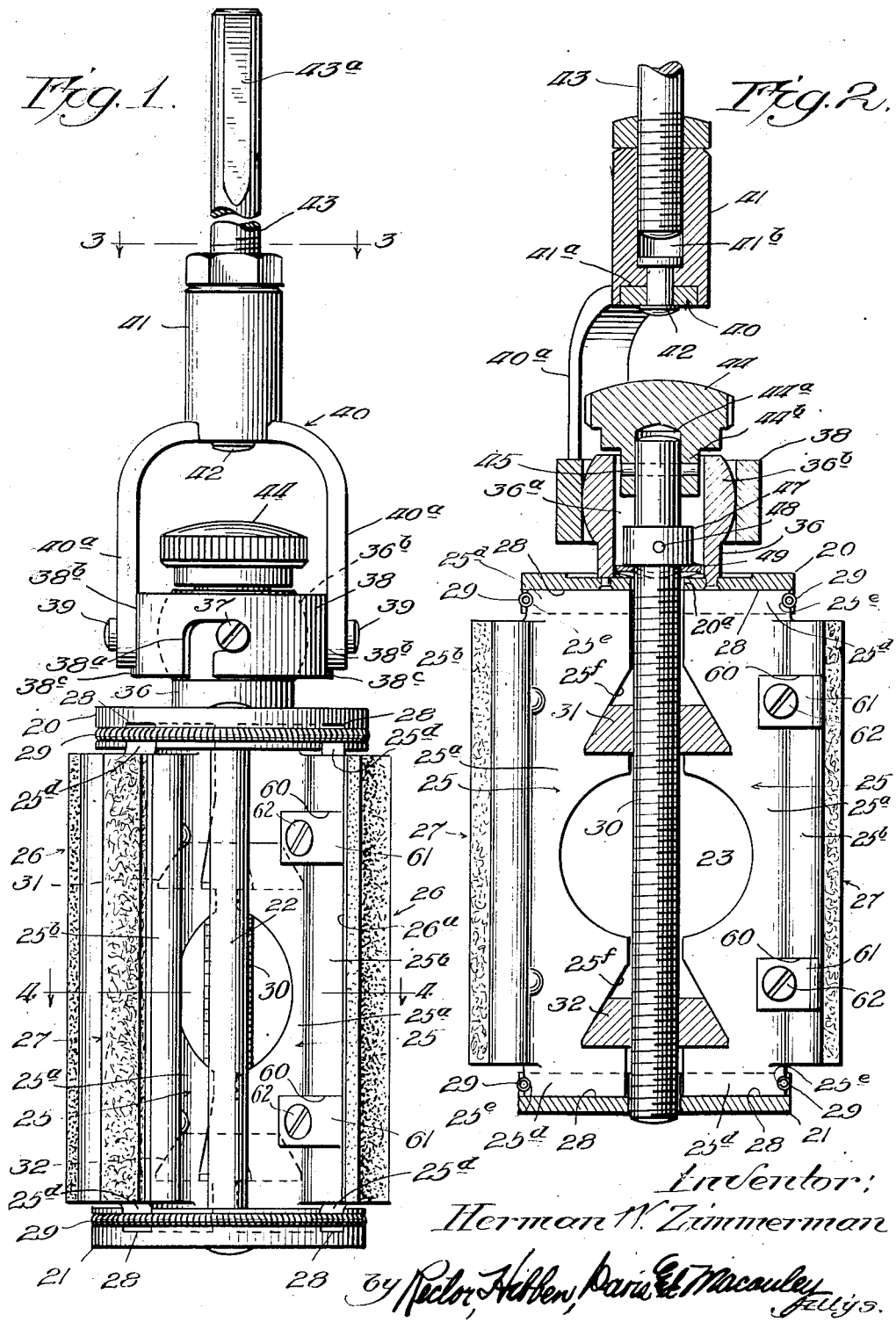

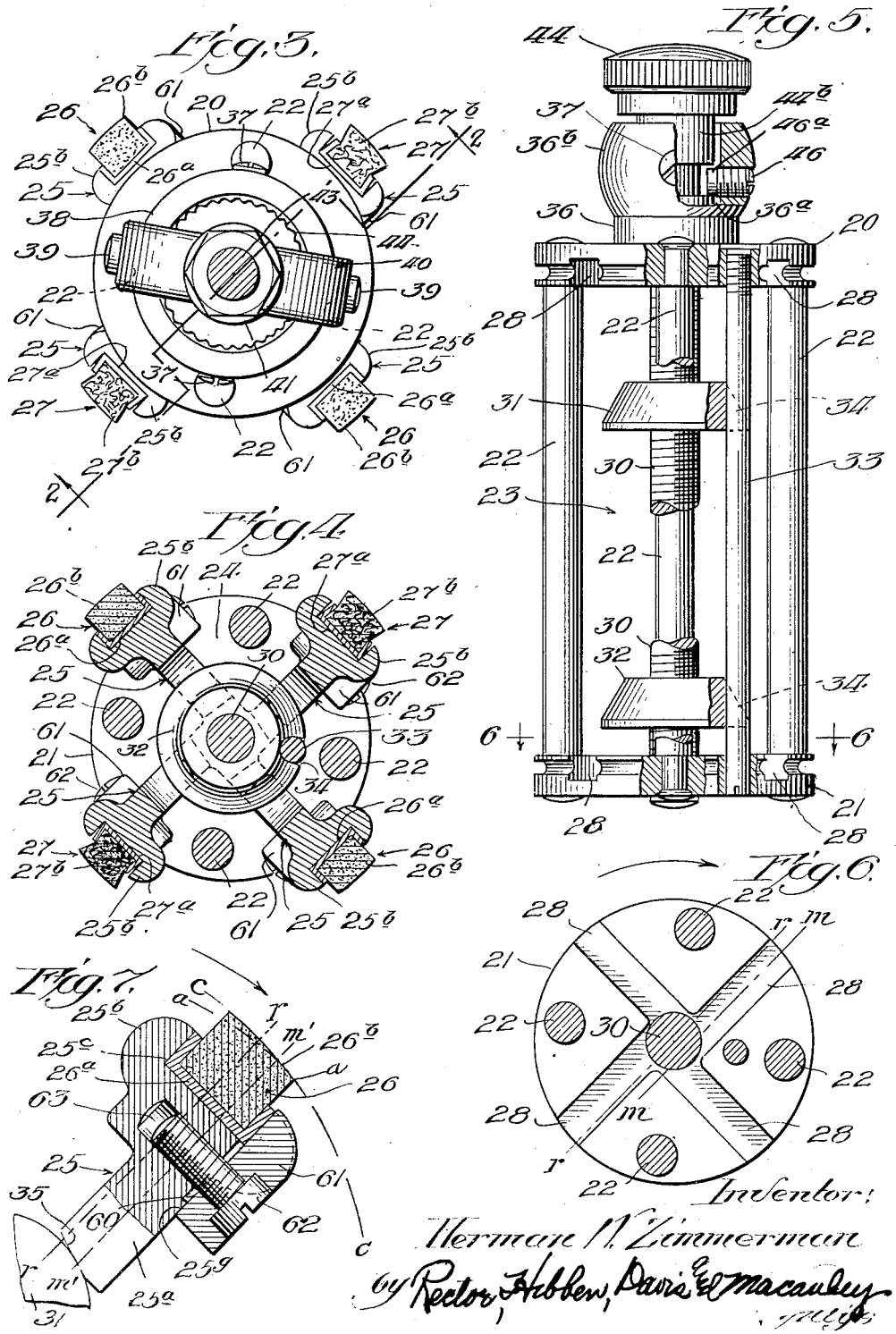

Jan. 8, 1935.  H. W. ZIMMERMAN  1,987,457
CYLINDER GRINDING TOOL
Filed Aug. 20, 1932   3 Sheets-Sheet 3
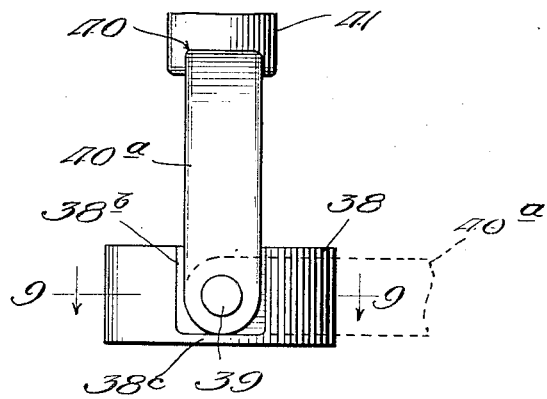
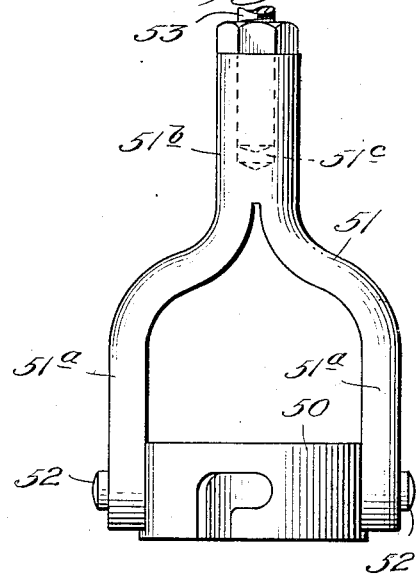
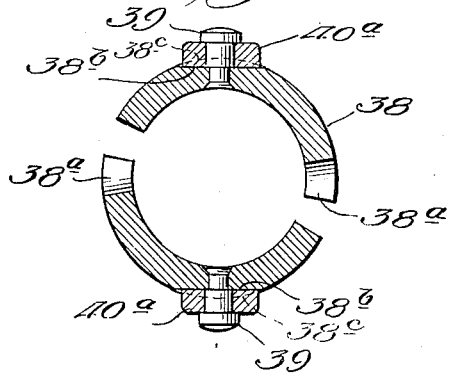
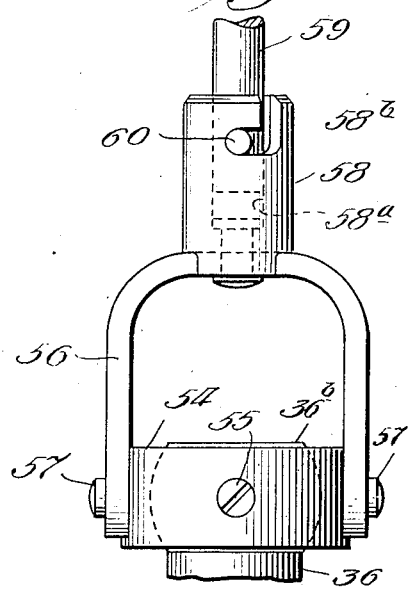
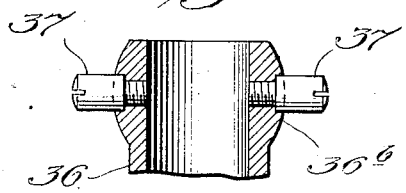
Inventor:
Herman W. Zimmerman Patented Jan. 8, 1935

1,987,457

UNITED STATES PATENT OFFICE 1,987,457

CYLINDER GRINDING TOOL

Herman W. Zimmerman, Chicago, Ill., assignor to Automotive Maintenance Machinery Co., Chicago, Ill., a corporation of Illinois Application August 20, 1932, Serial No. 629,608

13 Claims. (Cl. 51—184.3)

My invention relates to cylinder grinding tools of a character adapted for use either in factory-production work or in the servicing of worn cylinders to bring the surface of the cylinder to true cylindricity, accurate diameter and smooth finish.

One of the objects of my invention is to provide an improved, simple and inexpensive cylinder grinding tool of rigid, cage-frame type which is light in weight, easy to handle, smooth-running and noiseless in operation, is capable of a smooth and fast grinding action, operates without tendency toward chattering, seizing, or increased drag, requires but comparatively little power to operate, and is adapted for use over long periods of time, with a minimum of stone wear and a high degree of accuracy in performance, notwithstanding wear and the usual variations commonly experienced in the forming and machining of tool parts.

Another object is to provide a tool of the foregoing character embodying expansible and contractible cylinder-wall-contact elements which have their median lines offset forwardly of a tool radius line passing therethrough and parallel with such median line.

Still another, and more specific, object is to provide a cylinder grinding tool having a plurality of expansible and contractible abrasive, or the like, carriers which are mounted along the radius of the tool but with their median lines in radial direction offset from a tool radius line passing parallel therethrough, the carriers being expanded and contracted by means engaging the same on-center with the longitudinal median line thereof. Specifically, in carrying out this feature of my invention, the expansion and contraction of the carriers may be accomplished by adjustable cone-spreading devices engaging a longitudinal edge of the carriers, the engaged edge of such carriers being cut away at such an angle that, although the longitudinal median line of each of the carriers is located forwardly of the parallel tool radius line passing therethrough, the carrier edge engages the cone spreader device in an approximately point contact manner on-center with the carrier median line.

A further object is to provide a cylinder grinding tool of cage-like form embodying spaced end-plate members having grooves slidingly supporting the ends of carrier members, the grooves being so positioned with respect to the tool radius line passing therethrough parallel with the groove median line that rocking of the carrier in its supporting groove during opera- tion will cause relief in abrading pressure, rather than increase in the same, without materially affecting the rapid and intended grinding action of the tool.

Additional objects are to provide a new and novel form of means for expanding and contracting the abrasive carriers; to provide a new and novel form of detachable universal drive structure for operation of the tool in the cylinder; to improve the tool cage-like body or frame structure; to reduce to the minimum grinding stone vibration and rumbling of the tool in operation; to increase the rigidity of the tool as a whole; to minimize torsional strains and stresses imposed upon the operating parts; and to provide a tool wherein the grinding elements will serve to grind a greater number of cylinders thereby reducing the cost of the grinding operation, as well as maintenance and upkeep costs.

Other objects and advantages having to do with structural details and otherwise, will become apparent as this description progresses and by reference to the drawings, illustrating a preferred embodiment of my invention and, wherein,—

Figure 1 is an elevational view of one form of tool embodying my invention;

Fig. 2 is a longitudinal sectional view through the structure shown in Fig. 1 and taken substantially on line 2—2 of Fig. 3 with certain of the parts shown in elevation to more clearly illustrate the relationship of the tool parts;

Fig. 3 is a plan-sectional view taken substantially on line 3—3 of Fig. 1;

Fig. 4 is a horizontal section taken substantially on line 4—4 of Fig. 1;

Fig. 5 is an elevational view, partially in section, of the cage-frame portion of the tool of Fig. 1 with the abrasive and guide carriers and driving mechanism removed;

Fig. 6 is a horizontal section taken substantially on line 6—6 of Fig. 5;

Fig. 7 is an enlarged, fragmentary and partially-sectional view of one of the abrasive carriers illustrating the position of the same with respect to the tool radius and the expanding and contracting means;

Fig. 8 is a separated fragmentary view of the drive structure shown in Figs. 1 and 2;

Fig. 9 is a section taken substantially on line 9—9 of Fig. 8;

Fig. 10 is a fragmental, sectional view of that portion of the cage-frame structure of Figs. 1, 2 and 5 constituting part of the universal drive structure;

Fig. 11 is an elevational view of a modified form of universal drive structure; and Fig. 12 is an elevational view of still another form of universal drive structure embodying my invention.

In the drawings, I have illustrated a tool of a four-carrier type, two of the carriers being adapted to support abrasive members and the other two being adapted to support non-abrasive guide members; but it is to be understood that the number of carriers employed may be varied and that the carriers may support only abrasive members or any desired number of abrasive members and guide members.

Referring particularly to the structure shown in Figs. 1 to 10, inclusive, of the drawings, the tool embodies a cage-form including an upper end plate 20 and bottom end plate 21 rigidly joined together in spaced relation by a plurality of annularly arranged bars or posts 22 having their opposite ends rigidly secured, by upsetting the same or otherwise, to the respective end plates. These posts or bars 22 define a center space 23 from which lead a plurality of radial passageways 24 in each of which there is mounted for expansion and contraction movements a similarly constructed carrier member 25. These carriers are each provided with a flat, rectangularly-shaped body portion 25$^a$, the outer longitudinal edge of which is provided with an enlarged head 25$^b$ having a channel 25$^c$ formed therein and receiving, respectively, abrasive stone or abrasive units 26 and guide units 27. The end plates 20 and 21 are provided with similar and aligned grooves 28 in which end tongue-like portions 25$^d$ of the carriers are snugly but slidably mounted for guidingly supporting the carriers for expansion and contraction movements. Each of the carrier tongues is provided with a groove 25$^e$ in its outer edge for reception of spring rings 29 which yieldingly oppose the expansion movement of the carriers, which prevent accidental slippage of the carriers from their grooves, which tend to hold the carriers with their inner edges seated against the expanding means, and which contract the carriers as the expanding means is adjusted to permit of such movement. Each stone or abrasive unit comprises a channel-support 26$^a$ in which is secured any desired kind of abrasive element 26$^b$. Each guide unit comprises a channel-support 27$^a$ in which is secured felt or other non-abrasive material 27$^b$ formed and treated, preferably, in the manner disclosed in the co-pending application of Frederick G. Wacker and Herman W. Zimmerman, Serial No. 442,731. The units 26 and 27 are firmly held in place in their respective channels as follows, (Figs. 1, 2 and 5): At spaced points along one side of each channel cut-outs 60 are provided. Each counter cut extends into the base of the head channel 25$^c$ so that the channel supports 26$^a$ and 27$^a$ extend, at the point of the cut-out, beyond the bottom of the channel bottom. A clamp block 61 is mounted in each cut-out 60 and it is of sufficient length that one end seats upon the carrier body 25$^a$ just inwardly of the cut-out, as at 25$^g$, and its other end seats upon the adjacent and slightly projecting side of the channel support 26$^a$ or 27$^a$. Each clamp block is secured in place by a screw 62 passing freely therethrough and threadedly engaging an opening 63 in the carrier body 25$^a$. With this structure, as the screws 62 are tightened, the outer end of the clamp blocks 60 are rocked inwardly against the channel supports to press the latter inwardly and downwardly to hold them seated upon the head channel bottom.

The means for expanding the carriers, preferably, takes the form of a stem 30 axially disposed within the center space 23, which stem is screw-threaded substantially throughout its length and passes through threaded openings in a pair of spaced cone-shaped spreader devices 31, 32 for adjustable support of the latter. The cone spreader devices 31, 32 are frusto-conical in shape and have their smaller end portions extending in the same direction and toward the upper or drive end plate 20. The inner edges of the carriers 25 are notched as at 25$^f$ providing inclined edge surfaces shaped complementally to and engaged by the cone surfaces; wherefore, as the screw stem 30 is rotated in clockwise direction to move the cone devices 31, 32 toward the end plate 20, the carriers are expanded, and vice versa through the action of the spring rings 29, when the screw stem 30 is rotated in the reverse direction, the carriers 25 are contracted. The cone devices 31, 32 are held against rotation, as the screw stem 31 is rotated, by a post member 33 supported by the end plates 20, 21 and extending into notches 34 formed in the adjacent surfaces of the cone spreaders 31, 32.

It will be appreciated that the necessary slide-fit dimensions of the carrier tongues 25$^d$ in the end plate grooves 28 may be such that a very slight rocking of the carriers may take place when the tool is inserted in the cylinder and is rotated with the abrasive and guide members 26, 27 in contact with the cylinder wall surface. This condition may exist, or be amplified, due to slight variations in machining the parts of the tool, and it naturally will become more prominent and objectionable, unless otherwise guarded against, as wear takes place between the carriers and the end plate grooves. It will be further appreciated that, with the inner edge plane surface of the carrier blades resting on the cone spreader devices 31 and 32 and, if the median line of the grooves 28 and the carrier blades 25$^a$ should coincide with the radius line of the tool passing therethrough, relative rocking of the carriers upon the cone, such as might take place as above explained, will result in bodily tilting the carriers so as to increase the working radius of the tool and, consequently the abrading pressure. This would tend to cause the abrasive to seize the cylinder wall surface, resulting in an increased drag condition; wherefore the cylinder wall surface might not be accurately ground, the operation would not be smooth, the cylinder wall surface would tend to be roughened, chattering would tend to take place, a rumbling sound would exist in operation, and increased power would be required for operation of the tool. As above pointed out, one of the principal features of my invention has to do with the prevention of these conditions.

More particularly, the median lines $m$—$m$ of the end plate grooves 28 (Fig. 6) are disposed forwardly (with respect to direction of rotation as indicated by the arrow in Figs. 4 and 6) of the tool radius lines $r$—$r$ passing through the grooves 28 parallel with the median lines $m$—$m$. By so locating the end plate grooves 28, the carriers 25 are so positioned (Fig. 7) that the longitudinal median lines $m'$—$m'$ of their bodies are offset forwardly from the tool radius lines $r$—$r$ passing therethrough and parallel with the median lines $m'$—$m'$. With the grooves 28 and carriers 25 so offset, if the inner longitudinal edges of the carriers were squared with respect to the sides of such carriers and their longitudinal median lines, tendency of the carriers to rock counter-clockwise or in a direction opposite the direction of rotation (Figs. 4, 6 and 7) would tend to cause increased abrading pressure due to the tendency of the leading edge of the carrier unit to move outwardly with tendency to increase the working radius of the tool. However, to avoid this condition and to establish a condition causing the leading edge of the carrier structure to tend to rock away from the cylinder wall surface and reduce abrading pressure, I cut the inner longitudinal edges of the carriers away at such an angle, as indicated at 35, that when they are slid inwardly into engagement with the cone devices 31, 32, they will engage the same in an approximate point-like-contact manner on the median lines $m'$—$m'$ of such carriers. The movement of the contacting surface of the abrasive members 26 and guides 27 is illustrated in somewhat exaggerated fashion in Fig. 7 wherein the line $c$—$c$ represents the cylinder wall surface and the line $a$—$a$ represents the path which the leading edge of the abrasive and guide members 26, 27 would tend to follow due to rocking of the abrasive carrier 25 upon the cone devices 31, 32 about its point-contact therewith.

Rotation of the tool in the cylinder is accomplished by universal drive means which will now be described (Figs. 1, 2, 5, 8, 9 and 10). The upper end plate 20 is provided with an upwardly-extending, preferably, integral, comparatively short and tubular extension 36, the tubular portion $36^a$ of which communicates with an axial opening $20^a$ in the end plate 20. The outer and upper portion of the extension 36 is spherically shaped to provide a ball-like joint $36^b$ having a pair of diametrically opposed pins 37. A collar 38 having a pair of diametrically-opposed bayonet slots $38^a$ is mounted upon the ball-like joint $36^b$ with its bayonet slots operatively engaged with the ball-joint pins 37 to effect a readily detachable drive connection. The inner cylindrical wall surface of the collar 38 is of such dimension (Fig. 1) that the collar 38 will readily rock about the axis of the pins 37, providing a part of the universal drive action hereinbefore referred to. The collar 38, at a position at right angles to the bayonet slots $38^a$ and the pins 37, is provided with diametrically opposed pins 39 upon which are pivotally mounted the ends of arms $40^a$ of a U-shaped yoke member 40 (Figs. 1 and 9). Upon the upper central portion of the yoke member 40, I mounted a drive member 41 (Fig. 2) having a groove $41^a$ in its bottom for reception of the yoke 40. The member 41 is provided with an axially-extending threaded opening $41^b$ and a rivet 42 passing through the bottom of the member 41 or yoke 40 secures these parts rigidly together. The member 41 is adapted to receive the lower threaded end of a drive stem 43 which may be of any desired length and may have a flattened shank portion $43^a$ for connection to an electric drill (not shown) or any other suitable means for rotating the structure. From the foregoing, it will be obvious that rocking motions between the tool and the drive mechanism as provided by the pin connection between the collar 38 and the end plate projection 36 and between the yoke 40 and the collar 38, insures a readily detachable universal drive connection which compensate for alignment variations existing between the tool drive means and the tool or cylinder.

In the operation of the tool, adjustment of the carrier members becomes necessary from time to time and this is accomplished without removing the tool from the cylinder as follows: The screw stem 30 is extended upwardly and freely through the opening $20^a$ in the end plate 20 (Figs. 2 and 5) and through the opening $36^a$ in the end plate extension 36 where it extends into an opening $44^a$ in the depending shank portion $44^b$ of a knurled adjusting nut 44, the stem and nut being secured together by a pin 45. Axial removal of the stem 30 is prevented by a screw 46 having a stem extension $46^a$ projected into the tubular portion $36^a$ of the end plate extension 36 where it is confined between the bottom of the adjusting nut 44 and a collar 47 secured to the stem 30 by a pin 48. With this arrangement, the adjusting nut 44 may be rotated without longitudinal displacement to rotate the stem 30 and adjust the cone devices 31, 32 axially. It will be noted from Fig. 5 that the projecting end $46^a$ of the pin is of slightly lesser dimensions than the space in which it is confined, permitting slight axial shifting movement of the adjusting mechanism. To tension this movement and to prevent accidental rotation of the adjusting nut 44, once an adjustment has been made, a spring member 49 is disposed between the stem collar 47 and the top of the end plate 20. In this manner, the adjusting nut 44 is not only placed under constant tension but adjustment play is taken out of the adjustment mechanism and the cone devices 31, 32 are constantly pressed upwardly and in firm tension contact with the inner edge surfaces of the abrasive carriers. This arrangement also tends to hold the abrasive and guide members 26, 27 in uniform contact relation with the cylinder wall surface, the entire arrangement resulting in a more rapid grinding operation.

To facilitate connecting of the collar to the ball joint extension $36^b$, and to insure that the collar will always be in the proper position for engaging the pins 37, the collar at the points of connection with the yoke arms $40^a$ is flattened as at $38^b$ from its upper edge to near its bottom leaving at the bottom beneath the ends of the yoke arms $40^a$ curved projecting portions $38^c$ which, upon rotational movement of the yoke 40 about the pins 39, limit such movement to substantially 180 degrees. By this arrangement, the yoke 40 cannot be rotated about the pins to a position wherein the entrance to the bayonet slot $38^a$ will be disposed upwardly or on the upper side of the collar 38; wherefore the entrance to this slot is always in position for engagement with the pins 37 regardless of the relative rotative position of the yoke 40.

In Fig. 11, I have shown another form of universal connector which may be used instead of the connector shown in Figs. 1 and 2. Specifically, this connector comprises a collar 50, similar to the collar 38 and a yoke member 51 having a pair of arms $51^a$ pivotally connected to the collar 50 by pins 52, the yoke arms being extended to form an integral socket portion $51^b$ having a threaded opening $51^c$ adapted to threadedly receive a drive shaft 53. The mode of application and of operation of this drive connector is substantially the same as the previously-described form.

In Fig. 12, I have shown still another form of drive connector which comprises a collar 54 pivotally and non-detachably secured to the ball end portion $36^b$ of the end plate extension 36 by a pair of diametrically opposed pins 55. A yoke 56, similar to the yoke 40 (Figs. 1 and 2) has its arms pivotally connected to the collar 54 at right angles to the pins 55 by a pair of diametrically opposed pins 57. A cylindrical drive member 58 is connected to the upper central portion of the yoke 56 in the same manner as the drive member 41 (Fig. 2), which drive member is provided with a socket 58ª and a bayonet slot 58ᵇ. The socketed member 58 is adapted to receive the end of a drive shaft 59 having a laterally-projecting pin 60 thereon which engages the bayonet slot 58ª for detachably interlocking the drive shaft 59 and drive socket 58. In this form, the yoke and collar connections provide a universal drive joint, detachability being provided for as between the drive socket 58 and drive shaft 59.

The operation of my invention will be obvious from the foregoing. When it is desired to grind a cylinder, the tool is inserted in the cylinder in its contracted condition and the adjusting nut is then rotated in clockwise direction to expand the carriers and establish the proper abrading contact with the cylinder wall surface. As the tool is rotated by suitable drive means, the grinding operation takes place in a smooth, free running and noiseless manner, without grabbing and increased drag. A minimum of power is required for rotation of the tool. It will be noted that the universal drive connection with the tool body is located quite close to the upper ends of the abrasive and guide members 26, 27 whereby torsional strains and stresses imposed upon these members are reduced to the minimum. By so relating the cage-frame work and the universal drive structure, the rigidity, strength, durability and efficiency of the tool as a whole is increased. The life of the stones, conducive to reduced operating cost, is materially lengthened. The adjusting nut 44 is readily accessible for expanding and contracting the stone carriers without removing the tool from the cylinder, the universal drive structure being arranged to facilitate this adjustment. The drive connection with the tool, while affording universal action permits of ready detachability of the same, without interfering with the adjusting mechanism which passes through and beyond the universal joint structure. The use of universal joints in the adjusting mechanism is eliminated, which structure is of an exceedingly simple and inexpensive construction.

It will be understood that while I have shown and described several forms of my invention, other changes in details and arrangements of parts may be made without departing from the spirit and scope of my invention as defined by the claims which follow.

I claim:

1. In a tool of the class described, a body having spaced end plates with aligned, radially-directed grooves in their facing surfaces, each of said grooves being so positioned that a tool radius line passes therethrough parallel with its median line with said median line disposed forwardly of said radius line with respect to direction of rotation of the tool, an abrasive and/or guide carrier member having its ends slidably supported in said grooves for sole radial movement guidance thereof, and means for sliding said carriers outwardly and inwardly in said grooves to expand and contract the tool.

2. In a tool of the class described, a body, wall-engaging units supported by said body for expansion and contraction movements in radial direction, said units having body members so located that a tool radius line passes therethrough parallel with the longitudinal median line thereof with said median line disposed forwardly of said radius line with respect to direction of rotation of the tool, and axially-disposed means adapted to engage the inner longitudinal edges of said body members for expanding and contracting said units, said inner longitudinal edges being shaped to engage substantially the central portion thereof with said axially disposed means.

3. In a tool of the class described, a body having spaced end plates with aligned, radially-directed grooves in their facing surfaces, each of said grooves being so located that a tool radius line passes therethrough parallel with its median line and with said median line disposed forwardly of said radius line with respect to direction of rotation of the tool, carrier members having end portions slidably received in said grooves for sole guidance and support of said carriers, cylinder wall contacting elements supported by said carriers, and adjustable means for moving said carriers in said grooves to expand and contract the tool.

4. In a tool of the class described, a cage-like frame having a plurality of radially-directed passageways, carrier members located in said passageways and adapted for movement in radial direction for expansion and contraction of the tool, said carrier members each having a flat, plate-like body portion so located that a tool radius line passes therethrough parallel with the longitudinal median plane thereof with said median plane disposed forwardly of said radius line with respect to direction of rotation of the tool, means supporting the end portions only of said carrier members for expansion and contraction movements thereof, adjustable means engageable with said carrier bodies and movable in one direction for moving said carrier members radially for expanding the tool and for limiting contraction movement of said carrier members, and means operable upon movement of said expanding means in the opposite direction for moving said carrier members to contract the tool.

5. In a tool of the class described, a body, a plurality of carrier members supported by said body and each having a flat, plate-like body portion, cylinder wall contacting elements carried by the outer longitudinal edges of said carrier bodies, each said carrier body being so positioned that a tool radius line passes therethrough parallel with and to the rear of, with respect to direction of rotation of the tool, the median plane of said carrier body, an adjusting device engageable with the inner longitudinal edges of said carrier bodies, the inner longitudinal edges of each said carrier body being cut away at such an angle to the plane of the carrier bodies that said inner body edge contacts with said adjusting device approximately at the center of said inner edge on center with the median plane of said carrier body.

6. In a tool of the class described, a body, a plurality of carrier members supported by said body and each having a flat, plate-like body portion, cylinder wall contacting elements carried by the outer longitudinal edges of said carrier bodies, each said carrier body being so positioned that a tool radius line passes therethrough parallel with and to the rear of, with respect to direction of rotation of the tool, the median plane of said carrier body, an adjusting device engageable with the inner longitudinal edges of said carrier bodies, the inner longitudinal edges of each said carrier body being cut away rearwardly from near its forward part at such an angle to the plane of the carrier bodies that said inner body edge contacts with said adjusting device approximately at the center of said inner edge on center with the median plane of said carrier body, said cut-away edge portion permitting the carrier body to rock rearwardly relative to said adjusting device a considerable distance before the rear edge of said carrier body will engage said adjusting device.

7. In a tool of the class described, a body, a plurality of carrier members supported by said body and supported for radial adjustment movement for expanding and contracting the tool, said carrier members each comprising a plane-like body adapted to be mounted edgewise in said tool body, each said carrier body being so positioned that a tool radius line passes therethrough parallel with its median plane, with said median plane disposed forwardly of said radius line with respect to direction of rotation, an adjusting device disposed axially of said body and having a rounded surface adapted to engage the inner edge of each said carrier body, means for adjusting said adjusting device axially for moving said carrier members in radial direction for expanding and contracting the tool, each said carrier body having its inner longitudinal edge cut away from near its forward side toward its rearward side at such an angle that such edge of the carrier body engages approximately the center of said inner body edge on the center with the median plane of said carrier body.

8. In a cylinder grinding tool, a frame, members supported by said frame for expansion and contraction movements, said members having body portions positioned with their median line in radial direction offset with respect to direction of tool rotation forwardly of the tool radius, axially disposed, curved-surface means adapted to engage the inner, longitudinal edge of said members for expanding the latter, the inner longitudinal edge of each of said members being cut away at an angle to engage such edge with said means substantially on-center with respect to said median line of the body of each said member.

9. In a cylinder grinding tool, a frame, members supported by said frame for expansion and contraction movements, said members having body portions positioned with their median line in radial direction offset with respect to direction of tool rotation forwardly of the tool radius, and means engaging said members substantially only on-center with the said median lines of said bodies for expanding said members.

10. In a tool of the class described, a frame including spaced end plates having grooves in their confronting faces extending in a general radial direction, carrier members including flat-like body portions snugly mounted in said grooves for slide movement in radial direction, the median lines of said grooves in radial direction being offset forwardly, with respect to direction of tool rotation, from the tool radius to likewise offset the corresponding median line of said carrier body portions, axially disposed cone-shaped spreading means engaging the inner longitudinal edges of said body portions, the inner longitudinal edges of said body portions being cut away transversely at such an angle that they engage said cone-shaped spreading means in an approximately point-contact manner substantially on-center with respect to the median lines of said body portions.

11. In a tool of the class described, a frame having means for supporting abrasive carriers or the like for expansion and contraction movements, said carriers having body portions which are located with their median lines in radial direction offset forwardly, with respect to direction of rotation of the tool, of the tool radius, axially disposed means carried by said frame and engaging the inner longitudinal edges of said carriers for expanding said carriers, said means and the inner longitudinal edges of said carriers being so relatively shaped that, although said carriers are offset, they engage each other substantially on-center with the said median lines of said carriers.

12. In a tool of the class described, a body, wall-engaging units supported by said body for expansion and contraction movements in a radial direction, said units having elongated body members so located that the median line thereof in radial direction is offset laterally from the axis of the tool, and axially-disposed means adapted to engage the inner longitudinal edges of said body members for expanding and contracting said units, said inner longitudinal edges being shaped to engage substantially the central portion thereof with said axially disposed means.

13. In a tool of the class described, a frame having means for supporting abrasive carriers or the like for expansion and contraction movements, said carriers having body portions which are located with their median lines in radial direction offset laterally from the axis of the tool, and axially disposed means carried by said frame and engaging the inner longitudinal edges of said carriers for expanding said carriers, said means and the inner longitudinal edges of said carriers being so relatively shaped that, although said carriers are offset, they engage each other substantially on-center with the said median line of said carriers.

HERMAN W. ZIMMERMAN.